J. P. SCHMITZ.
Stench-Traps.
No. 151,548. Patented June 2, 1874.
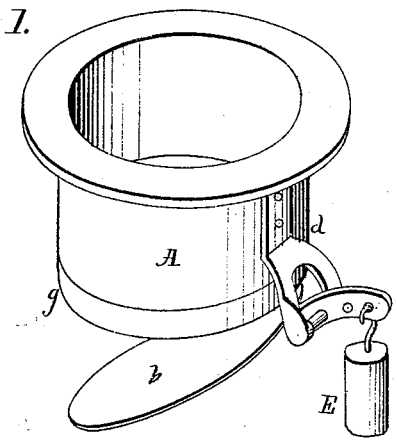
Fig. 1.
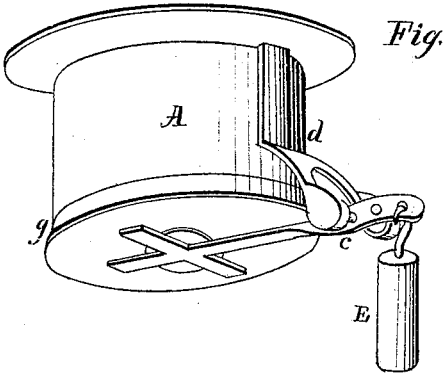
Fig. 2.
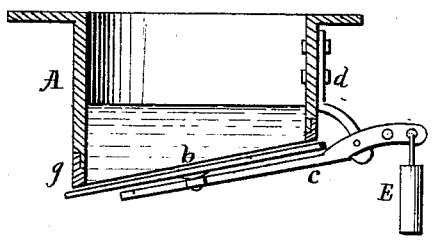
Fig. 3.
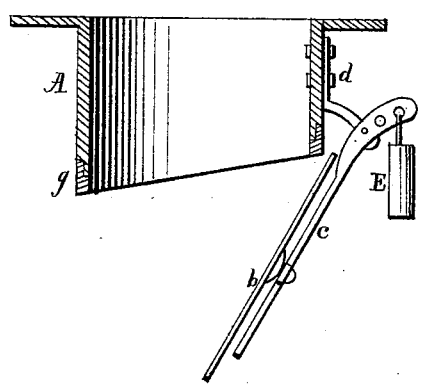
Fig. 4.
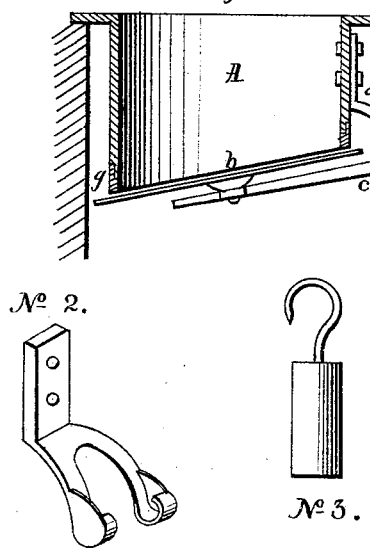
Fig. 5.
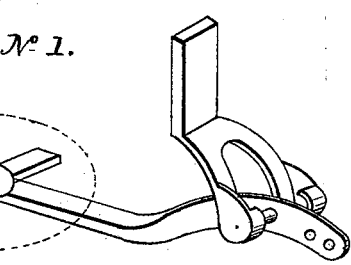
Nº 1.
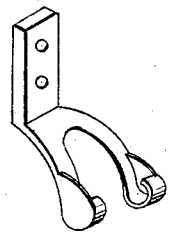
Nº 2.
Nº 3.
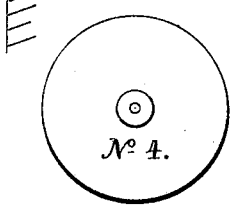
Nº 4.
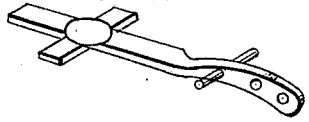
Nº 5.
Witnesses,
John Connolly
Joseph Ferber
Inventor,
John Peter Schmitz

UNITED STATES PATENT OFFICE.

JOHN PETER SCHMITZ, OF SAN FRANCISCO, CALIFORNIA.

IMPROVEMENT IN STENCH-TRAPS.

Specification forming part of Letters Patent No. 151,548, dated June 2, 1874; application filed February 4, 1874.

*To all whom it may concern:*

Be it known that I, JOHN PETER SCHMITZ, of San Francisco city and county, State of California, have invented an Improved Stench-Trap; and I do hereby declare the following description and accompanying drawing are sufficient to enable any person skilled in the art or science to which it most nearly appertains to make and use my said invention without further invention or experiment.

The object of my improvement in stench-traps is to provide a trap to suit all climates, even in such where there is not sufficient water to keep outdoor traps in tight joints, so as to prevent the escape of odors, as is the case in California, where it does not rain for four to eight months in the year, and there are also other places subject to long droughts. On that account outdoor traps heretofore in use always dry up, and when the water has evaporated, then odor and stench escape into houses or open air. This my improvement has proved to be a convenient and reliable trap, without water or other matter, for sewers and other pipes, for the purpose of preventing any foul odors from rising up through said pipes or sewers at all times, in wet or dry seasons.

Referring to the accompanying drawing, Figure 1 is a view of the trap with my improvement, the elastic edge, and the open smooth dropping cover with weight. Fig. 2 is a view of the trap when closed. Fig. 3 shows the trap closed with some water in it, but not enough to balance the weight. Fig. 4 shows the trap opened, when water and other matter passes through it. Fig. 5 shows the trap attached to a street-sewer opening, and, after the fluid had all evaporated, still retaining, with my elastic-edge improvement, a tight joint without water or other matter.

No. 1 shows my improved smooth (in the center) resting dropping cover; also, my improved balancing-beam and hinge detached from the trap. No. 2 shows the hinge separate. No. 3 shows the weight alone. No. 4 shows the smooth (in center) balancing dropping cover detached from the balancing-beam. No. 5 shows the balancing-beam separate.

A is the frame or tube, which can be made of any desired shape, and is made on one side (on the side from the top down to the elastic edge $g$) longer than on the other end, (on the end where the hinge is fastened,) giving the lower end or edge of the frame or tube a sloping edge from the hinge toward $g$. $b$ is the removable dropping cover or flap, made smooth on its upper surface, and loosely attached at its center to the balancing-beam. When the trap is closed the dropping cover is pressed tight to the elastic edge on frame or tube A. $c$ is the balancing-beam, which is hooked, or rests, on hinge $d$. The beam supports and gives its pressure to the center of dropping cover $b$. On the other end of the balancing-beam is hooked a weight, E. $d$ is the hinge screwed on frame or tube A, the said hinge having peculiar-shaped eyelets to admit the balancing-beam $c$ to be hooked in. E is the weight, which is placed at the end of balancing-beam $c$, and will keep the dropping cover closed until the pressure of water upon it will overbalance it. $g$ is the elastic edge on frame or tube A.

Finally, my improvements on the trap embrace the following elements in combination: First, the sloping edge. If stones or other hard matter fall into the trap, said stones or matter will roll toward the lowest end, and, as soon as the trap is forced open, be discharged. Second, the elastic edge. At or near the edge $g$, inside or outside of the frame or tube A, is placed an elastic substance, to project enough to form (without water or any other fluid being necessary) a tight joint when the dropping cover is pressed against it. Third, the smooth (in the center) balancing or resting removable dropping cover. This cover is an important improvement. On account of its smoothness all stones or other hard matter are ejected by the least opening. Besides, being balanced on its center gives it an elastic-like pressure, on account of its center pressure, and will not admit, even after the water has all evaporated, odor or stench to escape. The center pressure gives it also a more equal pressure all around toward the elastic edge on frame A. Fourth, the balancing-beam, which gives its power to the center of the dropping cover, can be removed from cover $b$, from hinge $d$, from weight E, and be easily replaced. Fifth, the weight E, which is hooked in and placed at the farthest end when the trap is open or closed, has a more decided power than a ball or other weight would have if not placed at the farthest end. Sixth, the hinge $d$, which can be removed or replaced on frame or tube A.

This my trap improvement can be made for all sizes of traps similarly constructed, from that of a street-drain to a house-sink.

Having thus described my improvement, what I claim, and desire to secure by Letters Patent, is—

The frame or tube A, having the elastic sloping edge $g$, in combination with the cover or flap $b$, loosely attached at its center to the weighted balancing-beam $c$, all substantially as described.

In witness whereof I hereunto set my hand and seal.

JOHN PETER SCHMITZ. [L. S.]

Witnesses:
    JOHN CONNOLLY,
    JOSEPH FERBER.